Aug. 12, 1947.     D. H. RING     2,425,345
MICROWAVE TRANSMISSION SYSTEM
Filed Dec. 23, 1942
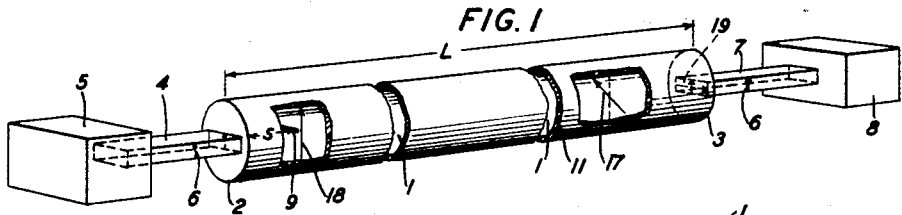
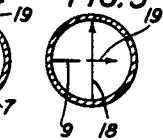
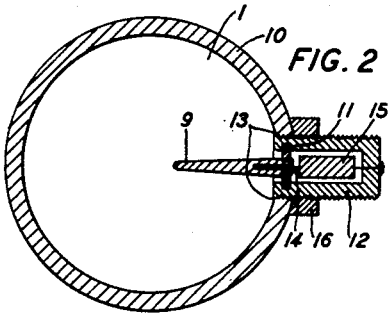
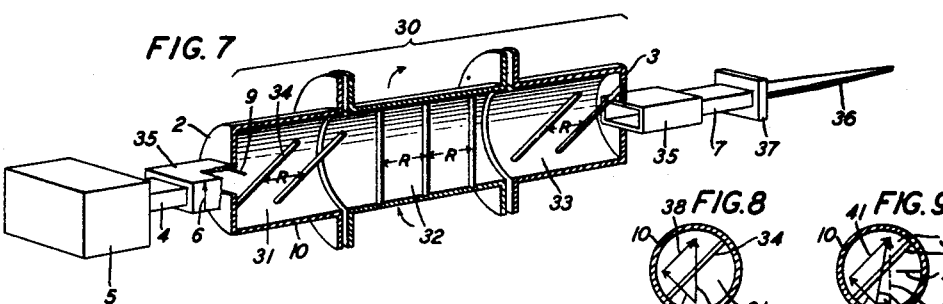
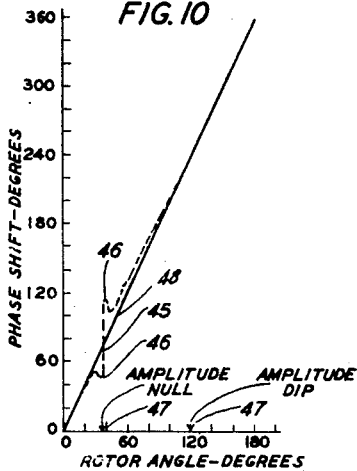
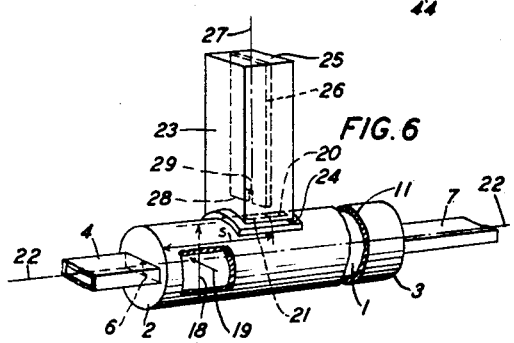
INVENTOR
D. H. RING
BY
A. J. Zerbarini
ATTORNEY Patented Aug. 12, 1947

2,425,345

UNITED STATES PATENT OFFICE 2,425,345

MICROWAVE TRANSMISSION SYSTEM

Douglas H. Ring, Red Bank, N. J., assignor to Bell Telephone Laboratories, Incorporated, New York, N. Y., a corporation of New York Application December 23, 1942, Serial No. 469,897

10 Claims. (Cl. 178—44)

1

This invention relates to transmission systems of the wave guide type, and particularly to wave guides for conveying plane polarized waves and wave guide phase changers for shifting the phase of plane polarized waves.

As disclosed in Patent 2,409,183, granted on October 15, 1946, to A. C. Beck, centimetric transverse electric ($H_{11}$) waves having a plane, that is, a fixed linear polarization, are commonly utilized in microwave radar systems, and a metallic wave guide system comprising a circular guide connected between two rectangular guides is often employed to convey the waves from the transceiver to the transceiving antenna. The rectangular guides constitute polarized input and output devices and the circular guide has a fixed length as measured in wave-lengths in the guide. Also, as disclosed in the copending application of C. B. H. Feldman, Serial No. 464,479, filed November 4, 1942, phase changers of the type described in the copending application of A. G. Fox, Serial No. 464,333, filed November 3, 1942, and comprising circular guide sections, are employed in certain radar systems for shifting the phase angle of a plane polarized wave, rectangular guides being connected to the input and output of each phase changer. The phase changers comprise a circularizer or 90-degree section for converting the fixed linear vertical wave polarization to a rotating linear or so-called circular polarization, a rotatable 180-degree section for shifting the phase of the circularly polarized wave and a 90-degree decircularizer section for converting the circular polarization to the original fixed linear polarization, each section including polar reactances. In effect, the phase shifter is a circular guide of cyclically varying length as measured in guide wave-lengths.

While the above systems have been used with success, it has been found in practice that the plane polarized wave supplied to the input of the circular wave guide of fixed length, as used in the system of the Beck patent mentioned above, may become tilted or rotated before reaching the output if the guide contains a more or less pronounced irregularity. As a result, the wave at the output of the circular guide comprises two components having a space quadrature relation, one being the desired component parallel to the original polarization and the other being the undesired or so-called cross component perpendicular thereto. The cross component is repeatedly reflected back and forth between the polarized input and output devices and if the guide length is equal to or in the neighborhood of a multiple of

2 a half wave-length, a resonant condition is established whereby the cross component, which is coupled to the desired component, extracts sufficient energy from the desired component to impair the operation of the system. As used herein the term "wave-length" refers to the wave-length as measured in the guide. Also, considering the phase shifter mentioned above, it has been found in practice that the spaced rods or polar reactances in the circularizer and decircularizer sections constitute discontinuities of appreciable magnitude at frequencies in the operating microwave band other than the design or mean frequency, since the spacing of the polar reactances, which spacing is three-eighths of a wave-length at the mean frequency, varies with frequency. Hence, instead of producing a true circularly polarized wave comprising two equal intensity components having a space quadrature and a time quadrature relation, the polar reactances produce an elliptically polarized wave which includes an undesired cross component whereby undesired reflection occurs. Also, since the phase shifter varies the length, in wave-lengths, of the circular guide, the guide becomes resonant at certain positions of the rotor, with the result that the effect of the irregularity is magnified particularly at frequencies other than the designed frequency, whereby the cross component extracts considerable energy from the desired component and the effective band width of the phase changer is limited. Moreover, because of the resonant condition the phase shift does not change linearly or uniformly as desired with rotation of the 180-degree section but varies more or less non-uniformly.

It is one object of this invention to compensate for irregularities in metallic wave guides.

It is another object of this invention to eliminate, in a circular wave guide conveying waves having a fixed linear polarization and containing an irregularity, the so-called cross component in space quadrature to the aforementioned polarization.

It is still another object of this invention to obtain a wave guide phase shifter having a wide frequency band characteristic.

It is a further object of this invention to obtain a wide band wave guide circularizer section for converting, at each frequency in the band, plane polarized waves to circularly polarized waves.

In accordance with one embodiment of the invention, the undesired cross component, for example, the horizontal component, produced by an irregularity in a circular metallic wave guide a multiple of a half wave-length long and energized with vertically polarized waves, or produced in one or both of the 90-degree sections of the above-mentioned phase shifter when energized with the vertically polarized waves, is eliminated or absorbed by a metallic linear probe adjustably inserted into the circular guide. The probe is aligned with the horizontal diameter of the circular section and extends into the section for a distance ordinarily, but not necessarily, less than the guide radius. In the case of the phase shifter, the probe extends at an angle of 45 degrees relative to the polar linear reactive rods included in the 90-degree section. The metallic probe is conductively connected through a carbon absorbing resistance to the outside surface of the metallic guide and is critically spaced from the input or output end of the section. By reason of the absorption of the horizontal component, reflection losses initiated by the vertically polarized load are eliminated and the intensity of the desired vertical component remains substantially constant. In the case of the phase shifter, conversion of the vertically polarized component into a true circularly polarized component, rather than an elliptically polarized wave, is accomplished and a wide band characteristic is secured.

In accordance with another embodiment of the invention, the undesired horizontal component is eliminated by means of a "chimney" type absorber comprising a rectangular guide attached to the circular guide and having its longitudinal axis aligned with the mid-point of a rectangular slot in the cylindrical guide wall. Considering the cross-sectional area of the circular guide containing the slot, the slot is curvilinear and coincides with a small arc of the circular guide, the arc, or more accurately the chord, subtended thereby being perpendicular to the desired vertically polarized wave conveyed in the circular guide. Also, considering the cross-sectional area of the rectangular slot, the long transverse dimension is parallel to the longitudinal axis of the circular guide and the short transverse dimension is perpendicular thereto. A sheet or plane dissipative resistance is positioned within the rectangular chimney guide for the purpose of absorbing and dissipating the undesired cross component extracted from the main guide. The slot size and slot position are chosen so as to achieve a match between the rectangular chimney guide of given size and the round guide, whereby reflection at the junction of the circular guide and the chimney guide is prevented. In operation, the vertical component passes by and is not affected by the slot and associated chimney absorber. As already intimated, the undesired horizontal component enters the chimney and is absorbed in the resistance sheet.

The invention will be more fully understood from a perusal of the following specification, taken in conjunction with the drawing on which like reference numerals denote elements of similar function and on which:

Fig. 1 is a perspective view and Fig. 2 a cross-sectional view of one embodiment of the invention, and Figs. 3, 4 and 5 are vector diagrams used in explaining the operation of the system of Fig. 1;

Fig. 6 is a perspective view of another embodiment of the invention;

Fig. 7 is a perspective view of a wave guide phase shifter modified in accordance with the invention, and Figs. 8 and 9 are vector diagrams, and Fig. 10 a curve, used in explaining the operation of the arrangement of Fig. 7.

Referring to Fig. 1, and assuming the system is employed for the emission of energy, reference numeral 1 denotes a circular metallic air-filled wave guide having a relatively great length, as for example a large multiple of a half wave-length, an input extremity or orifice 2 and an output extremity 3. The input 2 of guide 1 is connected to a rectangular metallic wave guide 4 and a translation device 5 which may be a transmitter included in a transceiver. The device 5 and associated guide 4 are arranged to deliver to circular guide 1 waves polarized in the vertical plane, as indicated by arrow 6, so that rectangular guide 4 constitutes a vertically polarized input device. The output 3 is connected through a rectangular guide 7 to a load device 8 adapted to utilize vertically polarized waves, the rectangular guide 7 constituting a vertically polarized output. The load device may be an antenna, such as a dielectric polyrod, a parabolic reflector or any other centimetric utilization device. If desired, each of rectangular guides 4 and 7 may be coupled to the circular guide 1 through an impedance matching transformer of the rectangular-round type, as described below in connection with Fig. 7. Numeral 9 denotes a metallic absorbing probe inserted, in accordance with the invention, diametrically and horizontally into guide 1, as shown more clearly in Fig. 2.

Referring to the cross-sectional view, Fig. 2, the metallic probe 9 is adjustably attached to the wall 10 of guide 1 through the annular insulator 11 and threaded brass cup 12 which engages the threaded aperture 13 in wall 10. Numeral 14 denotes a wire coaxially positioned within probe 9 and having one extremity soldered thereto. The other extremity of wire 14 is soldered to an absorbing resistor 15 which is conductively connected to brass cup 12. Hence, the probe 9 is conductively connected to the outer surface of metallic wall 10 through a dissipating resistance. The amount of projection of probe 9 into guide 1 may be changed by moving cup 12 relative to wall 10 and, after proper adjustment, cup 12 may be rigidly secured to wall 10 by means of lock-nut 16. As shown, the length of the projection of probe 9 into guide 1 is ordinarily less than the guide radius.

Referring to Figs. 3, 4 and 5, the operation of the embodiment illustrated by Figs. 1 and 2 is as follows: Centimetric waves produced in microwave device 5 are supplied over guide 4 to the input extremity 2 of guide 1. While, in radar operation it is ordinarily highly desirable to employ the same frequency, it has been found in practice that the frequency unavoidably varies, as much as 30 megacycles, because of tube replacements and service adjustments. The waves delivered to guide 1 are, as previously stated and as illustrated in Fig. 3, vertically polarized as shown by arrow 6. Considering the design or mean frequency, the vertically polarized wave 6 is propagated axially through guide 1 but because of one or more irregularities with in guide 1, which irregularities are not ordinarily visible, wave 6 is not vertical upon arrival at the output extremity 3 but is tilted or oblique as illustrated by arrow 17, Fig. 4. The tilted vector 17 comprises the desired vertical component 18 and the undesired horizontal component 19. Since the polarized load accepts the vertical component 18 and rejects the horizontal or cross component 19, reflection of the horizontal component occurs at extremity 3 and component 19 is returned to the input end 2. Assuming for the moment that guide 1 is not equipped with metallic probe 9, the polarized input 2 reflects the returned component and as a result the cross component is repeatedly reflected between the polarized input 4 and the polarized output 7. Since the length L of guide 1 is approximately equal to a multiple of a half wave-length, the guide 1 constitutes a resonant cavity for the undesired horizontal component 19. Also, since component 19 is inherently coupled to the component 18, component 19 extracts energy from the component 18 so that, during the resonant condition, the intensity of component 19 is increased, whereas the intensity of component 18 is decreased.

With probe 9 inserted as shown in Figs. 1, 2 and 5 in guide 1, in accordance with the invention, the horizontal component 19 is intercepted by probe 9 and the energy absorbed from the aforementioned component is dissipated in the resistor 15. In order to match the probe 9 to the guide, the distance S between the reflective input 2 and the probe 9, Fig. 1, is judiciously chosen and the amount of the projection of probe 9 is preferably adjusted, by means of movable cup 12, Fig. 2. In one actual embodiment S was made equal to five-sixteenths of an inch, where the half wave-length as measured in the guide was three inches. With the horizontal component 19 eliminated, the vertical component 18, Fig. 5, remains substantially constant and highly satisfactory operation obtains.

Thus far, the elimination of the cross component at the design frequency has been considered. In accordance with the invention, the band width limitation introduced by the irregularity is removed. First of all assuming again guide 1 is not equipped with probe 9, the band width limitation just mentioned is a function of the physical length of the guide 1. If the guide is very long as, for example, at least several wave-lengths at the design operating frequency, and if it also has a length equal to an odd multiple of a quarter wave-length at the design frequency, the resonant condition for the cross component does not obtain, but a small increase or decrease in frequency renders the guide a multiple of a half wave-length long, whereby resonance of the cross component is established. If the guide is relatively short, as for example three-quarters of a wave-length at the design frequency, the increase or decrease in frequency which renders the guide a multiple of a half wave-length long and produces the undesired resonance is relatively large. In general, the greater the physical length of the guide containing an irregularity, the smaller the conveyed band of frequencies. With the guide 1 equipped with probe 9, the cross component and the resulting resonance are eliminated at all frequencies in the band so that the band width is not affected by the irregularity. This feature of applicant's invention is particularly advantageous and useful inasmuch as the radar band width may be large and in certain installations the circular guide employed may be very long.

As previously indicated if desired, the chimney absorber illustrated by Fig. 6 may be utilized in the system of Fig. 1 in place of the probe 9. Referring to Fig. 6, reference numeral 20 denotes a rectangular slot in wall 10 of circular guide 1. The adjacent sides of slot 20 have different dimensions, the longer dimension 21 being parallel to the axis 22 of guide 1. The distance S between the mid-point of slot 20 and the guide extremity 2 is approximately a half wave-length, as measured in the guide. In the cross-sectional plane of guide 1 the arc of the slot, or more accurately the chord subtended by the aforementioned arc, is parallel to the undesired horizontal cross component 19 and hence perpendicular to the desired vertical component 18. The dimensions of slot 20 are such that the impedance is approximately equal to the characteristic impedance of guide 1. In one system, tested by applicant, the slot was one-eighth of an inch wide and three-eighths of a wave-length long and the internal diameter of the guide 1 was one inch.

Numeral 23 denotes a rectangular chimney guide or cavity having an open end 24 facing the slot 20 and a closed end 25. Numeral 26 denotes a plane or sheet dissipating resistance extending inside guide 23 parallel to the longitudinal axis 27 of chimney guide 23. Plane resistance 26 is attached to the closed end 25 of guide 23 and is shorter than guide 23, the bottom edge 28 facing slot 20. In the tested system mentioned above, the length or height of chimney cavity 23 was about three inches. Numeral 29 denotes a rectangular notch located at the mid-point of edge 28 and having a depth of approximately a quarter wave-length at the mean operating frequency for matching the cavity and included resistance 26 to the slot 20.

In operation, Fig. 6, the desired vertical wave 18 supplied to guide 1 is not affected by the presence of slot 20 and chimney cavity 23, but the undesired horizontal component 19 enters the cavity and is absorbed by resistance 26. Since the input impedance of the slot matches the characteristic impedance of guide 1, and since the notch 29 transforms the impedance of the chimney cavity 23 to the slot impedance, reflection and resulting losses are prevented. Hence, in accordance with this embodiment of the invention, the cross component is absorbed and the irregularity producing the cross component is, in a sense, compensated. In place of the sheet resistors 26, the cavity 23 may be filled with absorbing material such as plaster of Paris impregnated with carbon.

Referring to Fig. 7, reference numeral 30 denotes a wave guide phase shifter of the type disclosed in the copending application of A. G. Fox, mentioned above, and comprising a 90-degree circularizer section 31, a 180-degree rotating section 32 and a decircularizer section 33. Reference numerals 34 denote diametrial rods or polar reactances spaced in each section a distance "R" equal to approximately three-eighths of a wavelength at the mean operating frequency. As shown on the drawing, sections 31 and 33 are oriented so that rods 34 are positioned at an angle of 45 degrees relative to the vertical. Circularizer section 31 is equipped with a horizontal probe 9 spaced a critical distance S from the end 2 of phase shifter 30. Reference numerals 35 denote rectangular-round impedance matching transformers each having a rectangular cross section. One transformer is connected between the input extremity of phase shifter 30 and the guide 4 and constitutes a vertically polarized input; and the other transformer 35 is connected between the output end 3 and guide 7 and constitutes a vertically polarized output. Numeral 36 denotes a circular dielectric antenna element and numeral 37 denotes a transformer for matching the air-filled rectangular guide 7 to the solid dielectric circular antenna element 36.

In operation, referring to Figs. 7, 8, 9 and 10 and assuming first that probe 9 is not present, centimetric waves having a fixed vertical polarization 6 and a small frequency variation, as explained above, are supplied by device 5 through guide 4 and transformer 35 to the circular section 31. Considering for the moment the wave of mean frequency and assuming the diameters of rods 34 and the rod spacing R are exactly correct, the circularizer section 31 functions as disclosed in the Fox application to change the fixed linear polarization to a rotating or so-called circular polarization. The wave 6 at the output of section 31 comprises two components 38 and 39, Fig. 8, of equal intensity, the components 38 and 39 being in space quadrature and in time quadrature. Section 32 functions to change the phase of the rotating vector, and the decircularizing section 33 functions to convert the circularly polarized wave to a wave having a fixed vertical polarization.

Referring to Fig. 9, any slight deviation from the critical dimensions mentioned above constitutes an irregularity and causes tilting of the polarized wave 6, whereby the components 41 and 42 parallel and perpendicular to rod 34, respectively, have unequal intensities, and an elliptically polarized wave is produced. The tilted component comprises the desired vertical component 43 and the undesired cross or horizontal component 44. In view of the presence of the horizontal component, some loss occurs in the rotating section 32; and the component at the output end 3 may not be vertically polarized as intended, but may be tilted or circularly or elliptically polarized, or it may oscillate through the vertical position. At frequencies in the band other than the mean frequency the irregularity is especially pronounced since the rod spacing R as measured in wave lengths changes with frequency and is incorrect for these off frequencies. In addition, since section 32 rotates, the effective electrical length of the shifter 30 becomes, at periodic instances, 180 degrees so that a resonant condition is established for the cross component and, as in the system of Fig. 1, the intensity of the cross component 44 increases, the energy being extracted from the desired vertical component 43. As a result, the effect of the irregularity is magnified in a sense, and the operation of the shifter is greatly impaired. Again, since the irregularity is more pronounced at the off frequencies, the resonant condition is greater at these frequencies so that, even if fairly satisfactory operation is realized at the mean frequency, the combined effect of the irregularity and the resonant operation renders the band-pass characteristic of the shifter exceedingly narrow. Also, referring to Fig. 10, the resonant condition renders the phase shift-rotor angle characteristic 45 non-linear, the deviations 46 being related to the amplitude deviations 47.

With probe 9 inserted in circular section 31, Fig. 7, the horizontal component 44, Fig. 9, is absorbed and the vertical component 43 remains substantially constant. By eliminating the horizontally polarized component 44 a true circularly polarized wave is produced in the output of section 31 and only a vertical component exists in the output end 3 of phase shifter 30. Also, the phase shift changes linearly with rotation of section 32, as shown by the straight-line characteristic 48. More broadly, the horizontal probe 9 and the vertically polarized load 35 function together to absorb all components in the output of phase shifter 30 regardless of their polarization. Since the probe absorbs the cross component at all frequencies, the band width of the phase shifter is, in accordance with the invention, rendered relatively wide as compared to the band width obtained without probe 9. It has been experimentally determined that the maximum band width for a phase shifter not equipped with probe 9 is about 5 megacycles, whereas phase shifters equipped with probe 9 operate satisfactorily when the band width is 30 megacycles. Obviously in place of probe 9, the phase shifter 30 may be equipped with chimney absorbers of the type illustrated by Fig. 6.

While the operation of the embodiments illustrated on the drawing has been described, for the case of transmission, it is apparent that equally satisfactory operation obtains in the case of reception. In other words when device 8, Fig. 1, or antenna 36, Fig. 7, receives microwave waves for utilization in a receiver in device 5, the probe 9 or the auxiliary guide 23 functions to eliminate the undesired cross component. Moreover, the absorber may be placed at either end of the long pipe or phase shifter and still operate satisfactorily for both reception and transmission.

Although the invention has been explained in connection with certain embodiments it should be understood that it is not to be limited to the embodiments described inasmuch as other apparatus may be successfully utilized in practicing the invention.

What is claimed is:

1. In combination, a rectangular guide having a short and a long transverse dimension, a circular guide connected thereto, a device connected to said rectangular guide for supplying to both guides a wave polarized parallel to said short transverse dimension, and means for extracting from the circular guide completely and without reflection the energy in a component derived from said wave and polarized parallel to said long dimension, said means comprising a member for receiving said component without reflection attached to the wall of the circular guide, the spacing between the longitudinal axis of said member and the junction of said rectangular and circular guides being a fraction of a wavelength as measured in the guide, and a resistance element for absorbing without reflection and dissipating said energy directly connected to said member, said element extending perpendicular to the longitudinal axis of said circular guide.

2. A combination in accordance with claim 1, said member comprising a linear metallic element positioned within said circular guide and parallel to said long transverse dimension.

3. A combination in accordance with claim 1, said member comprising an auxiliary guide attached to the outer surface of said circular guide and extending perpendicular to said circular guide, said auxiliary guide having an aperture facing an aperture in the wall of said circular guide.

4. In combination, a metallic circular wave guide section, a pair of diametral rods extending completely across said guide, and a linear diametral conductive element extending partly across said guide and positioned at an angle of 45 degrees relative to said parallel rods.

5. In combination, a dielectric channel comprising a pair of rectangular wave guides connected together through a circular wave guide section, means for supplying to one of said rectangular guides a transverse electric wave polarized parallel to one transverse dimension of said rectangular guide, and means for compensating for discontinuities in said circular guide comprising a linear metallic element projecting radially into said circular section and perpendicular to the aforementioned transverse dimension of said rectangular guide, and a dissipating resistance connection between the outer surface of the guide and said element.

6. A wide band dielectric phase shifter for vertically polarized transverse electric waves comprising a 90-degree circularizing section, a 180-degree section, and a 90-degree decircularizer section, each section comprising a plurality of polar reactances, the reactances in said circularizer and decircularizer sections being parallel to each other and disposed at an angle of 45 degrees to said vertical polarization, and at least one of said last-mentioned sections including a linear metallic element extending horizontally within said section.

7. A wide band circularizing wave guide section comprising a circular wave guide, means for supplying a transverse electric wave having a fixed linear polarization aligned with a diameter of said section, a pair of parallel diametral rods positioned in said section at an angle of 45 degrees relative to said diameter, said rods being spaced a critical distance related to the mean frequency in said band, and a diametral rod having a length less than said diameter positioned in said section at an angle of 45 degrees relative to said rods, whereby the waves in the output of said section are circularly polarized regardless of their frequency.

8. In combination with a source for producing in a wave guide transverse electric centimetric waves having a given fixed linear polarization and a varying frequency, means connected to said guide for producing circularly polarized waves comprising a circular wave guide, a pair of parallel diametral rods extending completely across said guide, and a linear conductive element extending partly across said guide and disposed at an angle of 45 degrees relative to said rods.

9. A wide band adjustable phase changer comprising a 90-degree circularizer section, a 180-degree rotatable section and a 90-degree decircularizer section, said sections each comprising a circular wave guide and at least one of said sections including a pair of parallel diametral rods extending completely across the guide, and a diametral element projecting into said last-mentioned section at an acute angle to the parallel rods, whereby in the frequency-phase shift characteristic of said changer is substantially linear over a microwave frequency band 30 megacycles wide.

10. In combination, a horizontal circular wave guide section, means at one end for establishing in said section waves having a tilted polarization, and means for removing the horizontal component of said polarization comprising a rectangular guide attached to said circular guide and having its longitudinal axis coincident with the vertical diameter of said circular guide, a dissipating resistance positioned within said rectangular guide, said circular and rectangular guides having openings facing each other.

DOUGLAS H. RING.

REFERENCES CITED

The following references are of record in the file of this patent:

UNITED STATES PATENTS

| Number | Name | Date |
|---|---|---|
| 2,197,122 | Bowen | Apr. 16, 1940 |
| 2,088,749 | King | Aug. 3, 1937 |
| 2,257,783 | Bowen | Oct. 7, 1941 |
| 2,151,157 | Schelkunoff | Mar. 21, 1939 |
| 2,106,713 | Bowen | Feb. 1, 1938 |
| 2,270,638 | Llewellyn | Jan. 20, 1942 |
| 2,106,768 | Southworth | Feb. 1, 1938 |
| 2,151,118 | King et al. | Mar. 21, 1939 |